US006057548A

United States Patent [19]

Schatzberg

[11] Patent Number: 6,057,548

[45] Date of Patent: May 2, 2000

[54] INCREASED QUALITY THERMAL IMAGE RECORDING TECHNIQUE

[75] Inventor: Leah Schatzberg, Andover, Mass.

[73] Assignee: Agfa Corporation, Wilmington, Mass.

[21] Appl. No.: 09/040,623

[22] Filed: Mar. 18, 1998

[51] Int. Cl.[7] .............................. G03C 5/16; G01D 15/10

[52] U.S. Cl. ....................... 250/317.1; 250/318; 250/319; 346/76.1; 346/74.4

[58] Field of Search ................................ 250/317.1, 318, 250/319; 346/76.1, 74.4

[56] References Cited

U.S. PATENT DOCUMENTS 5,072,245 12/1991 Tamura et al. ...................... 346/76 PH

*Primary Examiner*—Edward P. Westin

*Assistant Examiner*—Nikita Wells

*Attorney, Agent, or Firm*—Alfred A. Stadnicki; Edward L. Kelley

[57] ABSTRACT

To record an image on a thermally sensitive medium, the medium is subjected to radiation from a single radiation emitter to heat a first portion of the medium to a first temperature which is below a threshold temperature at which the medium records. The medium is also subjected to radiation from the same radiation emitter to heat a different portion of the medium to a second temperature, which is above the threshold temperature, to record the image on the medium.

21 Claims, 5 Drawing Sheets

INCREASED QUALITY THERMAL IMAGE RECORDING TECHNIQUE

TECHNICAL FIELD

The present application relates to image recording on thermal sensitive media and more particularly to a thermal recording technique which increases image quality. The technique is especially suitable for imagesetters and platesetters.

BACKGROUND ART

Thermal imaging is a well known type of imaging in which a heat sensitive medium is subjected to radiation, such as a laser beam, to raise the temperature of the medium above a threshold temperature at which the properties of the medium are modified to record, either positively or negatively, an image on the medium. The thermal sensitive medium may be metallic or non-metallic, e.g., polyester film or aluminum plate material.

Thermal imaging is essentially a threshold energy process. When sufficient energy is applied to the thermally sensitive medium, its properties are transformed such that the image is recorded thereon with or without wet or dry processing. Thermal recording processes can vary from the ablation of metals to the transfer of non-metallic material to change of phase of materials. However, notwithstanding the process being utilized, the energy applied for recording must exceed a threshold recording energy level associated with the medium on which the image is to be recorded.

In optical thermal imaging systems, such as imagesetters and platesetters, a laser diode or solid state laser typically serves as the radiation source. The laser generates and emits a laser light beam which is then scanned on the thermal sensitive medium to record the image. The scan speed and laser power are set such that sufficient energy is applied to the medium to increase the medium temperature to above the threshold recording temperature to record the image. Accordingly, the laser power and scan speed of imaging systems are typically conjunctively determined.

High power lasers are utilized in commercial prepress imaging systems. Using such lasers, the imaging beam can be scanned at a high speed over the medium while still having the laser light beam impinge upon the medium for a sufficient period of time to increase the temperature of the medium beyond the threshold temperature necessary to record the image.

Various techniques have been previously proposed to reduce the radiation source power required to record an image on thermally sensitive medium. For example, it has been proposed to utilize a second radiation source to apply radiation onto an area of the medium to be transformed in order to preheat the medium to some extent before applying a separate radiation beam from a laser light source to record the image on the medium. However, such systems are complex in that they require that the two radiation sources be operated in a coordinated manner. Additionally, the cost of such systems are increased by the expense of the additional radiation source and its installation during fabrication of the system. Because the beams from the respective sources cannot, in practice, be perfectly aligned, a radiation loss occurs and therefore the total energy actually required for recording will exceed the theoretical energy level required for recording. Further still, the additional energy required to operate the second radiation source adds to the operating cost of the system.

Another proposed technique is to preheat a small portion of the area of the medium which will be transformed to a temperature below the threshold recording temperature and thereby modify the optical properties of the medium in a small portion of the area to be transformed, and to then apply the imaging beam over the entire area of the medium to be transformed, including the portion to which the preheating beam was applied, to record the desired image. Because the small portion to which the preheating beam was applied is completely overlapped by the area to which the imaging beam is applied to form the desired image, the small portion of the medium transformed by the preheating radiation beam does not affect the overall dimensions of the larger area of the medium transformed by the imaging beam. This technique may reduce the modulated energy required to form an image to some extent but at the price of increasing the total energy required to image.

Accordingly, a need exists for a lower energy, higher quality, single radiation source per pixel imaging system.

OBJECTIVES OF THE INVENTION

It is accordingly an objective of the present invention to reduce the energy required to form an image on a thermal sensitive medium.

It is a further object of the present invention to provide a lower energy thermal imaging system for forming improved quality images on a thermal sensitive medium.

It is still another object of the present invention to provide a reduced cost thermal imaging system for forming high quality images on a thermal sensitive medium.

Additional objects, advantages and novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

The present invention is directed to image recording on a thermal sensitive media. The media may be metallic or non-metallic media and the technique is equally applicable to wet or dry or no processing.

In accordance with the invention, the medium on which the image, whether text or graphics, is to be recorded either positively or negatively, is subjected to radiation from a radiation emitter. That is, both areas of the medium to be recorded, i.e., thermally transformed, and those to remain unrecorded are subjected to the radiation. The radiation may be in any form and could, for example, be a laser beam. The radiation emitter can be of virtually any type and may, for example, be a laser source which generates and emits a laser beam or an end of an optical fiber from which a laser beam is emitted.

The areas of the medium which are to remain unrecorded are subjected to a beam of radiation from the emitter at a first power. The radiation beam will preheat these areas of the medium to a first temperature which is below a threshold temperature at which the medium is thermally transformed. In some but not all cases, it may be preferable for the preheated temperature of the areas of the medium which will remain unrecorded to be only slightly below the threshold record temperature.

The areas of the medium which are to be recorded are subjected to the beam of radiation from the same radiation emitter at a second, higher power, to increase the temperature of those areas of the medium to a second temperature which is above the threshold recording temperature. The image is thereby recorded on the medium.

Preferably, the power of the radiation beam impinging upon the medium is switched between the first and second power levels by changing the modulated power of the beam using a modulator which is preferably controlled by a controller such that the modulator operates in a first mode to pass radiation at a first power to the areas of the medium which will remain unrecorded and then in a second mode to pass radiation at a second power, which is different, and beneficially higher, than the first power, to record on other areas of the medium to form the image.

Alternatively, a directly modulated laser source, e.g., a laser diode and laser diode array could be utilized in lieu of a continuous waive laser source and modulator. Further, when utilizing a continuous light source, modulation could be performed with special light modulators or other mechanical or acoustic or electrical or optical modulation techniques.

Advantageously, the radiation emitter continuously emits radiation onto the medium while the modulator is being switched between first and second modes of operation by the controller. The continuously emitted radiation beam is thereby modulated such that the beam impinging on the medium switches between the first and second powers. This results in a radiation beam of the first power impinging on the areas of the medium which will remain unrecorded and a radiation beam of the second power impinging on the areas of the medium which will be recorded.

The radiation is typically deflected by an optical scanning device such as a spin mirror, prism, moving lens or other type of scan element onto the medium. The radiation, whether being emitted onto areas of the medium to be recorded or to remain unrecorded, is typically scanned at the same speed. If desired, the controller could control a modulatable power source, such as a modulatable laser, instead of the modulator to vary the radiation beam power for the two modes of operation, i.e., non-recording and recording. This could be particularly advantageous in a system where multiple sources are used.

The total power required to record fine feature images using the present invention will typically be significantly less than the power conventionally required to increase the temperature of the medium to the record temperature, i.e., to a temperature equal to or above the threshold record temperature, and thereby record the same image on the same medium. Accordingly, the present invention can be used to reduce the radiation power which would otherwise need to be generated to record the image on the medium.

BEST MODE FOR CARRYING OUT THE INVENTION

Figure 1A:
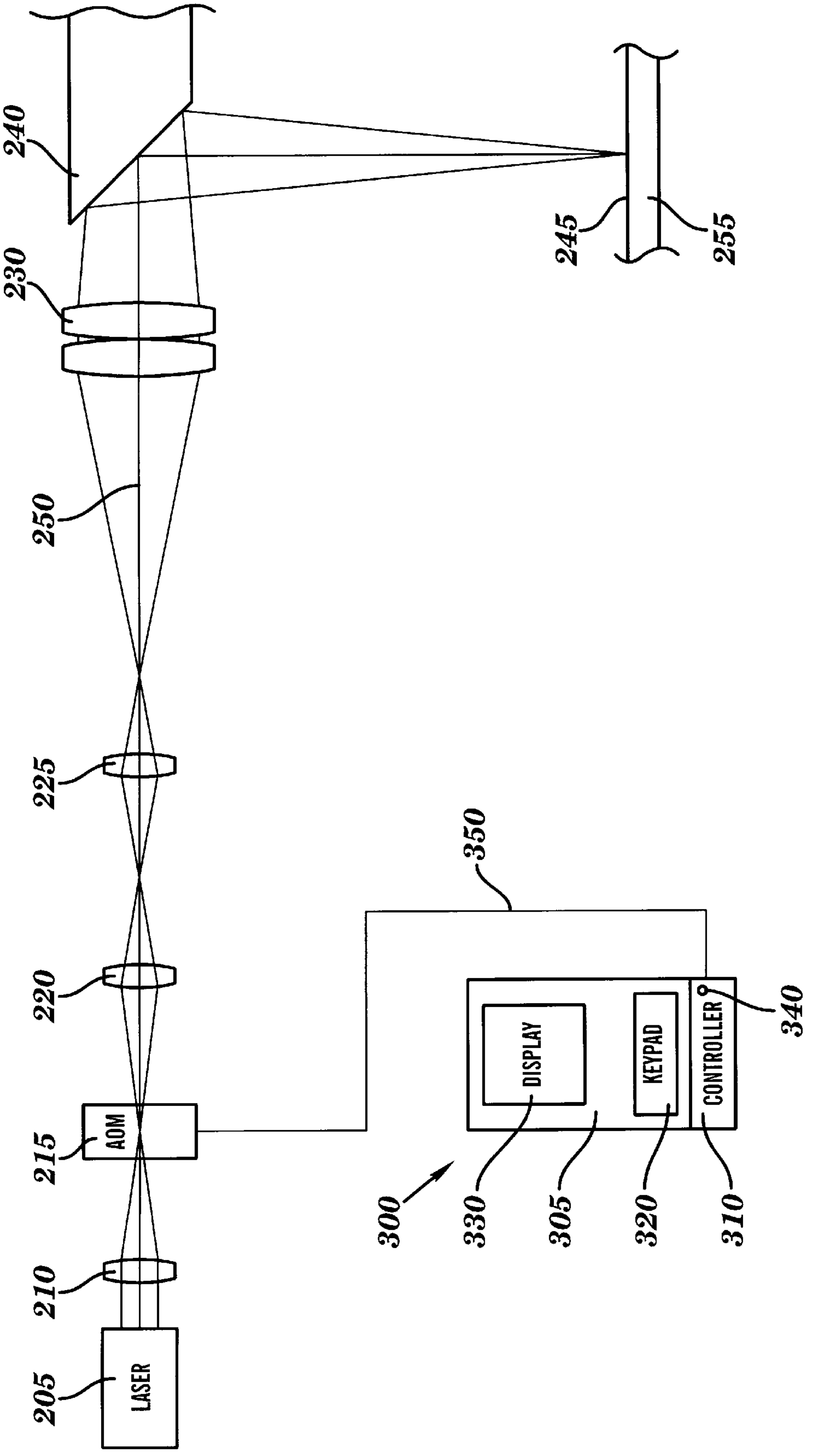
FIG. 1A depicts an imaging system in accordance with the present invention.

FIG. 1A depicts an imaging system having a single power laser radiation source 205 for generating and emitting a laser light beam along optical path 250. The emitted laser light beam is focused through the focus lens 210 before entering the modulator 215. The modulator 215 may be an acousto-optic modulator (AOM), electro-optics modulator (EOM), spatial light modulator (SLM) or other type of modulator. The modulator 215 modulates the beam between two predefined power levels, one above and one below the threshold record power necessary to transform the thermally sensitive medium 255 to record an image thereon.

The laser light beam passes through first and second focusing lenses 220, 225 and is focused by the final focus lens assembly 230 onto the spin mirror 240. The spin mirror 240 rotates at a speed which is a function of the medium type, available laser power and system addressability. Spin mirror 240 deflects the laser light beam onto the image plane 245 of the thermally sensitive medium 255.

The modulator 215 is controlled by a control system 300 which may include a control panel 305 in which a keypad 320 and display 330 are mounted. The control system 300 also includes a controller 310 which has a communication port 340 through which input from a remote operator input device can be received. It will, of course, be recognized that the port 340 may also be used to transmit information from the controller 310 to a remote operating site if so desired. To control the modulator 215, the controller 310 generates and transmits signals to the modulator 215 over the communication line 350. The controller also controls the laser 205 and spin mirror 240 by transmitting commands over other communications lines (not shown). As will be discussed further below, the controller includes a processor for generating the command signals to the modulator 215 in accordance with programmed instructions stored within the controller 310.

The imaging system of FIG. 1A operates such that, responsive to an operator command which, for example, is entered on the keypad 320 and displayed, if desired, on the display 330, the controller 310 generates a signal to initiate operation of the system, including the laser 205, modulator 215 and spin mirror 240. The laser 205 generates and emits a radiation beam through the focus lens 210, to the modulator 215.

In accordance with signals transmitted from the controller 310 to the modulator 215 via the communications line 350, and representing an area of the image plane 245 which is to remain unrecorded, the modulator operates in a first mode to modulate the laser light beam emitted from the laser 205 and thereby deflect a portion of the radiation beam emitted by the laser 205. The deflected portion of the beam is blocked within, and therefore not output from, the modulator 215. This will reduce the power of the radiation beam emitted from the modulator 215 to a power below the threshold power required to record on the medium. Accordingly, the radiation beam output from the modulator 215 along the optical path 250 in the first operational mode, which will be referred to as the non-recording beam, is of a first power which is insufficient to record on the medium. The non-recording beam is passed through the first and second focusing lenses 220, 225 and the final focus lens assembly 230 onto the spin mirror 240.

The spin mirror 240 deflects the non-recording beam so as to scan the image plane 245 in an area which is to remain unrecorded. The power of the non-recording beam is established such that the non-recording beam impinging on the image plane 245 preheats the area of the thermal sensitive media 255 which is to remain unrecorded to a temperature below the threshold temperature at which the thermally sensitive medium 255 is transformed.

When appropriate, the controller 310 of the control system 300 also generates and transmits to the modulator 215 via the communication line 350 a second control command, representing an area of the image plane 245 on which recording is to occur. Responsive to this command, the modulator 215 switches to a second mode of operation, having different modulation parameters, to modulate the laser light beam emitted from the laser 205 so as to deflect a different, and typically lesser, portion of the laser light beam. Hence, a different portion of the beam radiation is blocked within the modulator 215 and the output radiation beam has a second power which is different and typically higher than the power of the non-recording beam. This recording beam is output from the modulator 215 along the optical path 250 through the first and second focusing lenses 220, 225 and the final focus lens assembly 230 onto the spin mirror 240.

The spin mirror 240 deflects the recording beam so as to scan the image plane 245 in an area which is to be recorded. The power of the recording beam is established such that the beam impinging on the image plane 245 heats the area of the thermal sensitive media 255 which is to be recorded to a temperature above the threshold temperature at which the thermally sensitive medium 255 is thermally transformed.

The controller 310 controls the laser 205 operation such that the laser 205 continually generates and emits a radiation beam which is modulated by the modulator 215 responsive to the signals from the controller 310 between the non-recording power and recording power.

It should be noted that, although the spin mirror 240 may be operable at different addressabilities and hence different speeds, it operates at only a single speed during the modulation by the modulator 215 of the radiation beam. More particularly, responsive to the entered addressability, the controller 310 generates a scan speed signal which is transmitted to the spin mirror 240 to set the speed at which the spin mirror rotates to correspond to the selected addressability and media type. Once the addressability has been selected, the spin mirror speed remains the same while the radiation beam generated by the laser 205 is modulated by the modulator 215 between the non-recording power and recording power in accordance with the control signals transmitted over communication line 350.

It will also be recognized by those skilled in the art that the modulator described above could be replaced by a modulatable laser source, such as modulatable laser diode. In this regard, the modulatable laser source could be controlled by the controller to operate in first and second modes to emit laser light beams of a first power and a second power.

Figure 1B:
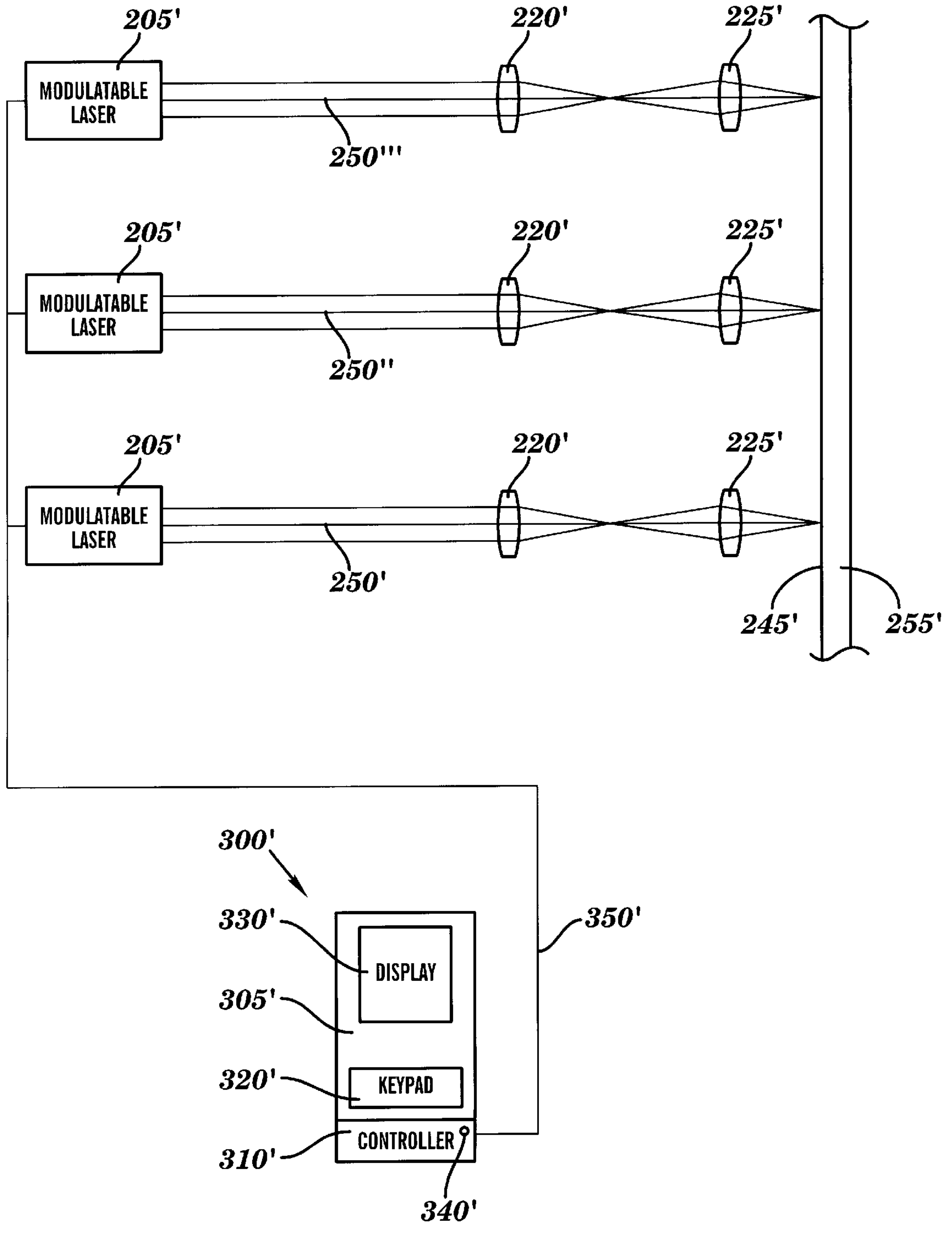
FIG. 1B depicts a multibeam imaging system with directly modulatable sources in accordance with the present invention.

FIG. 1B depicts an imaging system having multiple, modulatable, single power laser radiation sources 205' for generating and emitting laser light beams along optical path 250', 250" and 250'". The emitted laser light beams are focused through the focus lenses 220' and 225' before impinging on the image plane 245' of the thermal medium 255'. Each modulated source 205' emits a beam modulated between two predefined power levels, one above and one below the threshold record power necessary to transform the thermally sensitive medium 255' to record an image thereon.

The laser light beams respectively pass through first and second focusing lenses 220', 225' onto the image plane 245'. The spin mirror 240 rotates at a speed which is a function of the medium type, available laser power and system addressability. Spin mirror 240 deflects the laser light beam onto the image plane 245 of the thermally sensitive medium 255.

The modulatable sources 205' are controlled by a control system 300' which may include a control panel 305' in which a keypad 320' and display 330' are mounted. The control system 300' also includes a controller 310' which has a communication port 340' through which input from a remote operator input device can be received. It will, of course, be recognized that the port 340' may also be used to transmit information from the controller 310' to a remote operating site if so desired. To control the modulatable sources 205', the controller 310' generates and transmits signals to the sources 205' over the communication line 350'. As will be discussed further below, the controller includes a processor for generating the command signals to the sources 205' in accordance with programmed instructions stored within the controller 310'.

The imaging system of FIG. 1B operates such that, responsive to an operator command which, for example, is entered on the keypad 320' and displayed, if desired, on the display 330', the controller 310' generates a signal to initiate operation of the system, including the lasers 205'. The lasers 205' generate, modulate and emit radiation beams through the focus lenses 220' and 225', to the image plan 245'.

In accordance with signals transmitted from the controller 310' to the sources 205' via the communications line 350', and representing an area of the image plane 245 which is to remain unrecorded, the sources respectively operate in a first mode to modulate the generated laser light beams 205 and thereby deflect a portion of the radiation beam emitted by the lasers 205'. The deflected portion of each of the beams is blocked within, and therefore not output from, the lasers 205'. This will reduce the power of the radiation beam emitted from one or more of the lasers 205' to a power below the threshold power required to record on the medium. Accordingly, the radiation beams output from the lasers 205' along the optical paths 250', 250" and 250'" in the first operational mode, which will be referred to as the non-recording beam, is of a first power which is insufficient to record on the medium. The non-recording beam is passed through the first and second focusing lenses 220', 225' onto the imaging plane 245', so as to scan the image plane 245' in an area which is to remain unrecorded. The power of the non-recording beam is established such that the non-recording beam impinging on the image plane 245' preheats the area of the thermal sensitive media 255' which is to remain unrecorded to a temperature below the threshold temperature at which the thermally sensitive medium 255' is transformed.

When appropriate, the controller 310' of the control system 300' also generates and transmits to the sources 205' via the communication line 350' a second control command, representing an area of the image plane 245' on which recording is to occur. Responsive to this command, the sources switch to a second mode of operation, having different modulation parameters, to modulate the generated laser light beams so as to deflect a different, and typically lesser, portion of the laser light beams. Hence, a different portion of the beam radiation is blocked within the sources

205' and the output radiation beam has a second power which is different and typically higher than the power of the non-recording beam. This recording beam is output from the sources along the optical paths 250', 250" and 250'" through the first and second focusing lenses 220' and 225' so as to scan the image plane 245' in an area which is to be recorded. The power of the recording beam is established such that the beam impinging on the image plane 245' heats the area of the thermal sensitive media 255' which is to be recorded to a temperature above the threshold temperature at which the thermally sensitive medium 255' is thermally transformed.

The controller 310' controls each laser 205' operation such that the laser 205 continually generates, modulates, and emits a radiation beam responsive to the signals from the controller 310' between the non-recording power and recording power.

Figure 2:
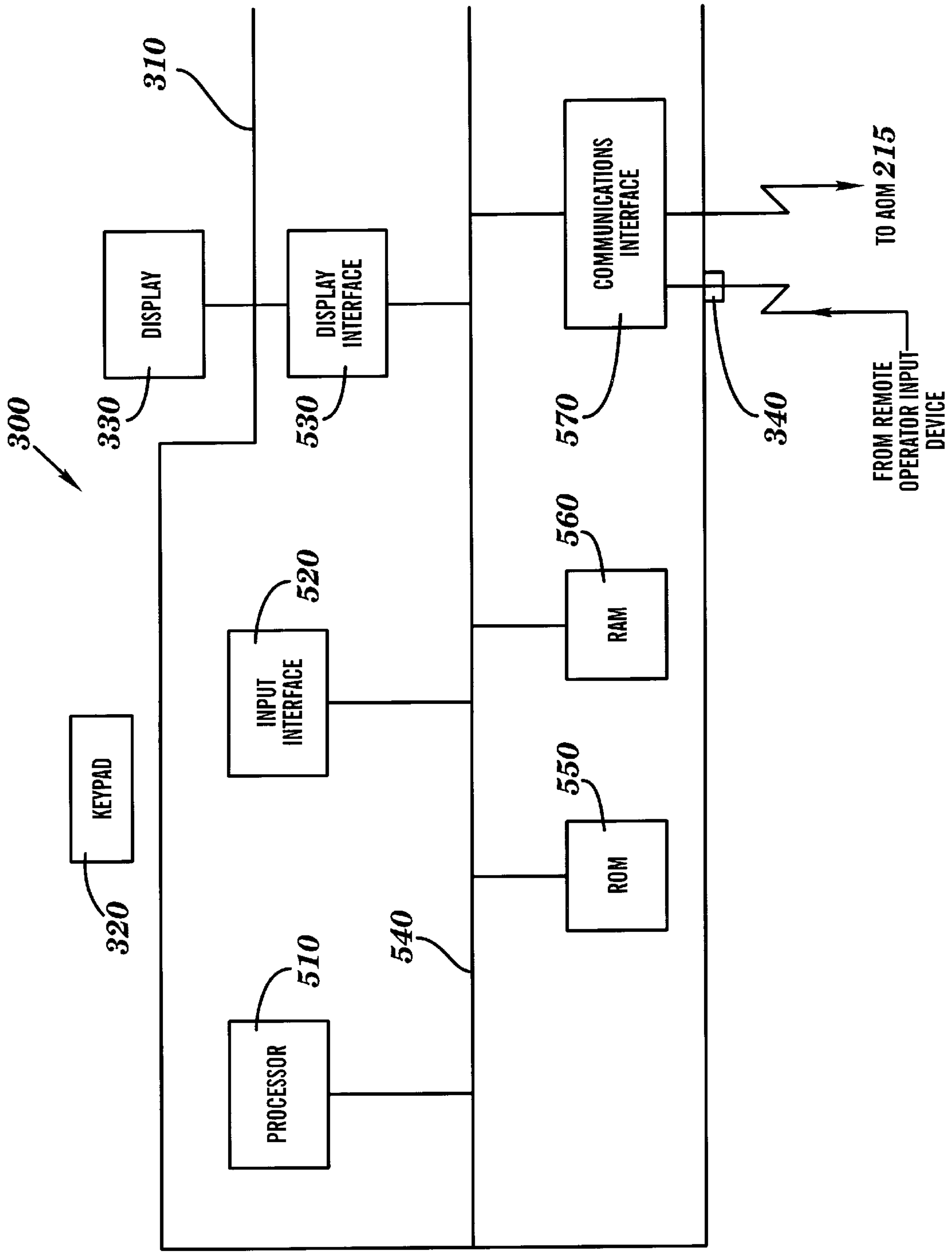
FIG. 2 depicts a simplified block drawing of the control system depicted in FIG. 1A.

FIG. 2 depicts a somewhat simplified depiction of the control system 300. It will be recognized by those skilled in the art that control system 300 could be easily modified to perform the functions of control system 300' as described above. As shown in FIG. 2, the controller 310 includes a digital processor 510 and display 430. The control system 300 may be assembled from commercially available or specially designed hardware components. One aspect of the uniqueness of the controller 310 resides in the software instructions which are stored on its read only memory (ROM) 550.

In addition to the processor 510 and ROM 550, the controller 310 includes a communications interface 570 for communicating via the communications line 350 with the modulator 215. The communication interface 570 is also interconnected to the communications port 340 for receiving, and if desired transmitting, data from and to a remote operator input device. The communications to the modulator 215 include those instruction signals necessary to direct the modulator 215 to operate in the different modes of operation as described above.

The input interface 520 provides an interface to the keypad 320 and the display interface 530 provides an interface to the display 330 of the control system 300. A random access memory (RAM) 560 is provided to temporarily store data which will be utilized by the processor 510 in accordance with the programmed instructions of the controller 310. A bus 540 transfers signals between the various subcomponents within the controller 310 in the customary fashion. It will be recognized that the development of the programming instructions stored on the ROM 550 to instruct the processor 510 to operate as described herein is a matter of routine programming effort which will be easily accomplished by one skilled in the art without the need for experimentation.

The operation of the control system 300 depicted in FIG. 2 will be described with reference to the embodiment of FIG. 1A. The controller 310 components interact in a conventional fashion. Accordingly, routine operations of the depicted components will, in general, not be described, since these operations are well understood by those skilled in the art.

To begin operation of the imaging system of FIG. 1, the imagesetter or platesetter operator enters a selected system addressability and media type on the keypad 320 of the control system 300. This information is transmitted via the input interface 520 and bus 540 to the processor 510. The processor 510 generates a signal which is transmitted by the communication interface 570 via the communication link 350 to the modulator 215. In response to this signal, the portions of the laser beam which will be deflected by the modulator 215 in the first and second modes of operation are set by the modulator.

In accordance with the image signal received by the control system 300, for example via port 340, the processor 510 generates signals which are transmitted via interface 570 and communications line 350 to the modulator 215. In accordance with these signals, the operating modes of the modulator 215 are switched to correspond with the imaging requirements. The processor 510 processes all information received in accordance with the specific programming instructions for the controller 310 stored on the ROM 550. These instructions will typically be transferred to and retrieved from the RAM 560 during operation of the control system 300.

More particularly, the processor 510, in accordance with the programmed instructions, generates a signal which is received by communications interface 570 via the bus 540 and transmitted to the modulator 215 to control the modulator 215 to modulate the radiation beam generated by laser 205. In accordance with the control signal received from the controller 310, the modulator 215 operating, for example, in the first mode emits a non-recording light beam having the first predetermined power. This light beam is scanned on the image plane 245 of the thermal sensitive medium 255 by the spin mirror 240 which also operates in accordance with the control signal received from the controller 310 to scan a portion of the medium 255 which is to remain unrecorded.

To scan a portion of the medium which is to be recorded, the processor 510, in accordance with the programming instructions stored on the RAM 560, generates another control signal which is transmitted by the communications interface 570 via the communication line 350 to the modulator 215. Responsive to this signal, the modulator 215 switches to its second mode of operation and modulates the light beam generated by laser 205 so as to emit a recording light beam having a second predetermined power. The spin mirror scans the imaging beam on the image plane 245 of the thermally sensitive medium 255. Accordingly, the record beam is scanned to record on a different portion of the medium.

The processor 510 in accordance with its programming instructions will generate still another signal to switch the mode of operation, of the modulator 215 back to a non-recording mode to, for example, scan the next portion of the imaging plane 245 which is to remain unrecorded. A still further control signal will be generated to again switch the modulator 215 to the record mode to record another portion of the medium. The control sequence continues until the desired image has been recorded on the image plane 245 of the thermal sensitive medium 255.

It will be recognized by those skilled in the art that the beam power in each mode of operation must be set based upon the particular thermally sensitive medium on which the image will be recorded, the resolution or addressability desired, the spot size of the laser, and the screening technique being used. By careful selection of the operational parameters of the modulator 215 in each mode of operation the image can be optimized such that high resolution imaging of increased quality can be obtained while reducing the imaging system's overall power requirements.

Figure 3A:
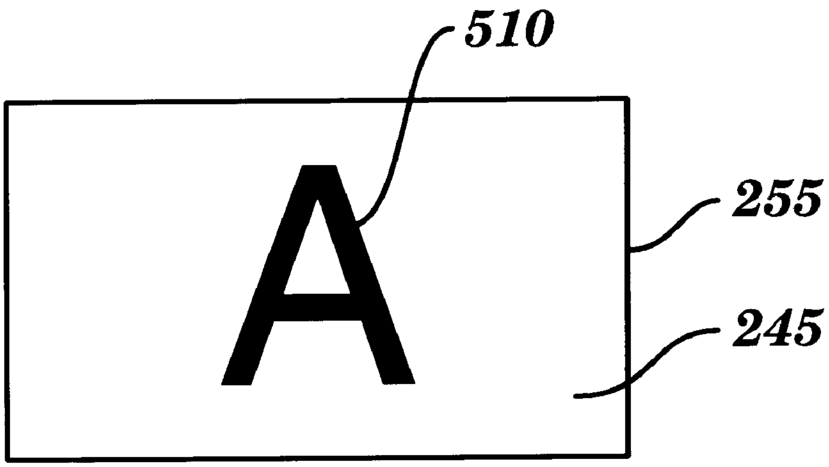
FIG. 3A depicts unrecorded and recorded portions of a positively imaged medium in accordance with the present invention.

FIG. 3A depicts the above described unrecorded and recorded portions on the thermal sensitive medium 255. As shown, the image plane 245 is scanned on the unrecorded areas, i.e., those areas not including the positively imaged letter "A", by the non-recording laser light beam emitted from the modulator 215 when operated by the control system 300 in the first operational mode. More particularly, unrecorded areas are scanned with the modulator 215 operating in the first mode so as to be preheated to a temperature below the threshold record temperature for the thermally sensitive medium 255. The recorded areas 510 of the image plane 245, i.e., the portions of the medium positively imaged with the letter "A", are scanned with the modulator 215 controlled by the control system 300 to operate in the second mode to record the image on the image plane 245 of the thermal sensitive medium 255.

Figure 3B:
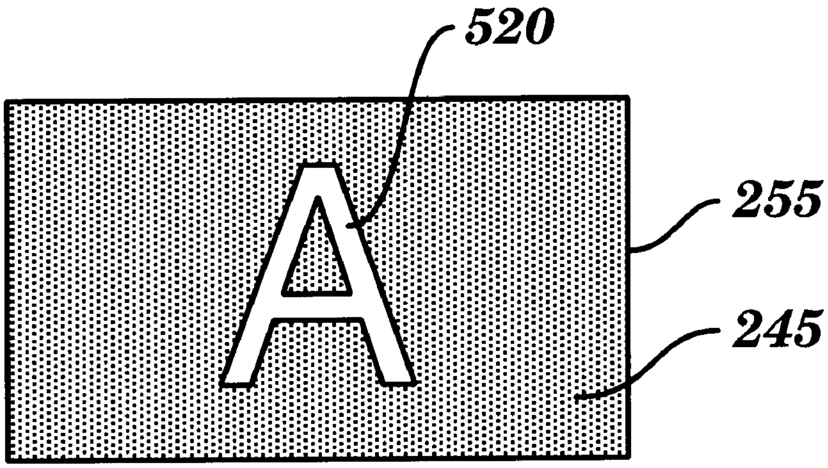
FIG. 3B depicts unrecorded and recorded portions of a negatively imaged medium in accordance with the present invention.

FIG. 3B depicts another exemplary imaging arrangement in which the modulator 215 is controlled by the control system 300 to operate in the first mode to scan the non-recording light beam over those portions of the image plane 245 which will remain unrecorded to negatively image the letter "A" and to operate in the second mode to record on the other portions of the image plane 245.

With the non-imaging beam heating areas of the medium 255 which will remain unrecorded to a temperature just below the threshold record temperature, the areas of the medium to be recorded may be effectively preheated to some extent. The amount of preheating, if any, will be determined by the thermal transfer characteristics of the medium 255 and other factors, as will be well understood by those skilled in the art. For example, it may be possible to predetermine the preheat temperature of the portions of the medium 255 in which the image 510 of FIG. 3A is to be formed and to utilize this information in setting the radiation power of the laser in the second mode of operation so as to be capable of recording the image on the image plane 245 of the thermally sensitive medium 255.

However, the unrecorded and recorded portions of the medium will typically vary in size and locations. Hence, the recorded portions of medium will often have somewhat inconsistent preheating. In such cases, the preheating effect, if any, may be irrelevant in determining the minimum laser power required to impinge on the image plane 245 of the thermal sensitive medium 255 during the second mode of operation of the modulator 215 to record an image.

Whether or not areas of the medium 255 to be imaged are preheated, the total energy required to record the small features of the desired positive or negative image on the medium using the dual mode operation as described above is less than that using conventional techniques. However, notwithstanding these factors, a reduction in the required total energy can be realized utilizing the above described technique.

Figure 4:
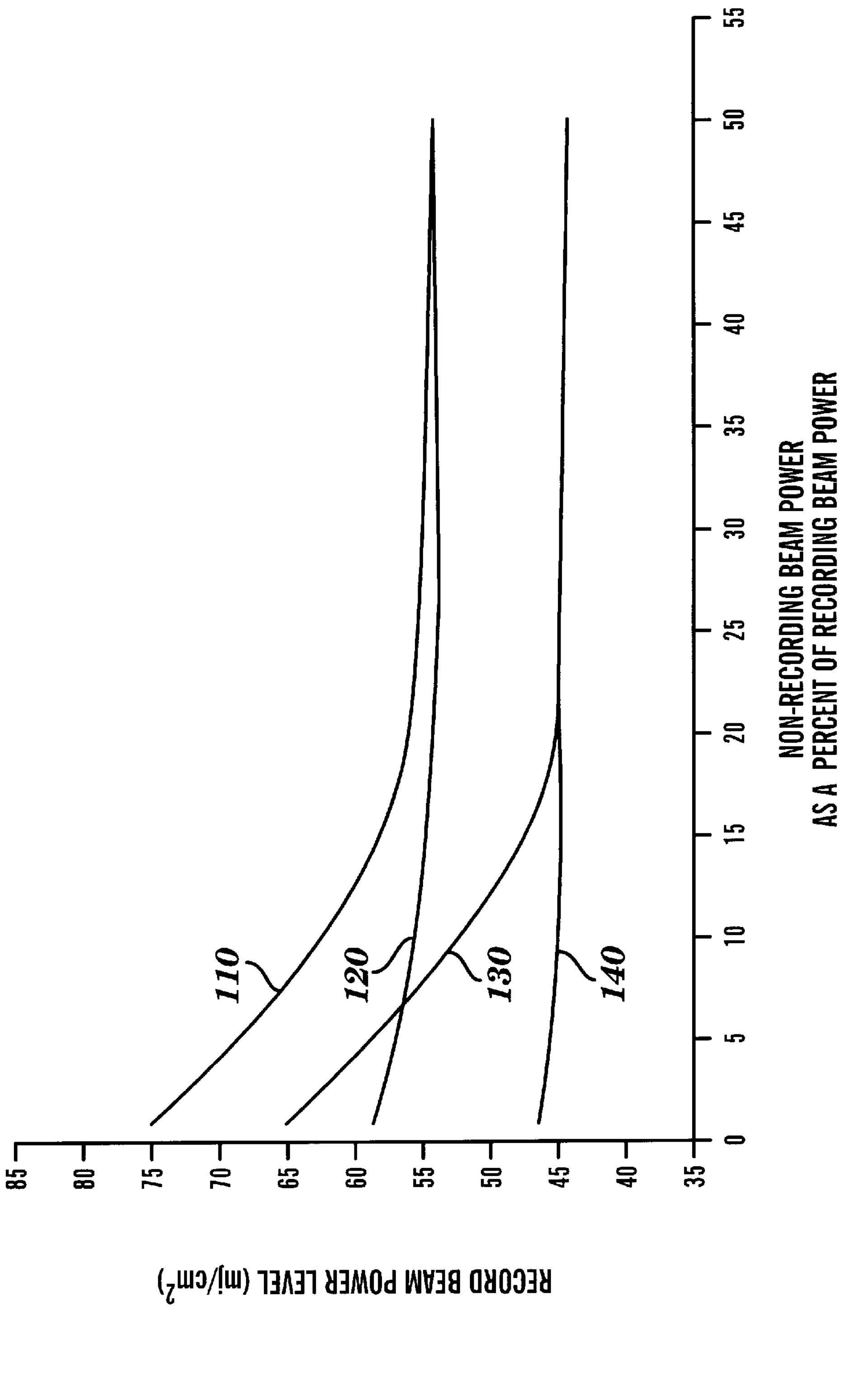
FIG. 4 charts the recording beam power required at different non-recording beam power levels.

FIG. 4 shows the change in exposure power required to properly render single pixel horizontal and vertical lines through the range of radiation beam power levels. More particularly, curves 110 and 120 respectively depict radiation beam power to record a 1 by 1 pixel line having a spot size of 18 $\mu$m. Line 110 reflects the radiation power to record a vertical line. Line 120 reflects the radiation power required to record a horizontal line with a spot size of 18 $\mu$m. Curves 130 and 140 are similar to the curves 110 and 120 except that the spot size is increased to 22 $\mu$m. As will be well understood by those skilled in the art, for most thermal recording systems, optimization of the recording parameters typically consists of setting a recording spot size. The pulse width is then adjusted to match the exposure response of single pixel horizontal and vertical lines. The curves depicted in FIG. 4 represent 2400 dot per inch (dpi).

As shown by curve 110, to form a vertical line having an 18 $\mu$m spot size using conventional techniques, the energy level of the recording beam is, in the example shown, approximately 75 to 80 mj/cm$^2$, as reflected by the intersection of curve 110 with the vertical axis of the FIG. 4 graph. That is, this is the recording beam power required if there is no non-recording beam. In accordance with the present invention, as the energy level of the non-recording beam applied to the medium is increased to approximately 15% of the recording beam power, the recording beam power to produce the single pixel vertical line is reduced to between 55 and 60 mj/cm$^2$.

As the non-recording beam power is increased beyond 15% of the recording beam power, the amount of corresponding reduction in the recording beam power decreases. Accordingly, at a non-recording beam power of approximately 20% of the recording beam power, a substantially optimum balance of the non-recording beam and recording beam powers is obtained. The 20% threshold, as shown in FIG. 4 also works well for the recording of an 18 $\mu$m single pixel horizontal line as represented by curve 120 and 22 $\mu$m horizontal and vertical lines represented by curves 130 and 140.

As indicated by the FIG. 4 curves, by operating the modulator 215 of FIG. 1A or modulating laser sources of FIG. 1B in the dual modes as described above, the total system power required to record images on a thermal medium can be significantly reduced. For example, taking curve 110, the formation of a single pixel vertical line which would typically require a record beam power of between 75 and 80 mj/cm$^2$ will, at 20% non-recording beam power, require power of 55 to 60 mj/cm$^2$. In this regard, the recording beam power will be between 55 and 60 mj/cm$^2$ and the non-recording beam power will be between 11 and 12 mj/cm$^2$. A line width match is roughly achieved at a level of 20%–30% non-recording beam power. Further increases in the non-recording beam power will begin to mark the unexposed areas of the medium. The exact cut-off point will, of course, be medium and laser beam quality dependent, since certain thermal sensitive medium will have lower gradation than other thermal sensitive medium. Staying near the lower end of the 20%–30% non-record beam power range should leave enough margin to perfectly match horizontal and vertical lines widths at the same exposure power.

The invention has been described in the context of particular portions of the thermal medium being unrecorded and other portions of the medium being recorded. In this regard, it should be understood that the non-recording and recording radiation beams are preferably applied on a pixel by pixel basis. That is, adjacent pixels may be respectively subjected to non-recording radiation and recording radiation in accordance with the present invention.

As described in detail above, the present invention can be implemented so as to reduce the total energy requirements of a thermal imaging system and to form higher quality images on a thermal sensitive medium. The invention further facilitates the manufacture of reduced cost thermal imaging systems for forming high quality images on a thermal sensitive medium.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

I claim:

1. A method for recording an image on a thermally sensitive medium, comprising the steps of:
   - subjecting a first portion of the medium to radiation from a single radiation emitter to heat the medium to a first temperature; and
   - subjecting a second portion of the medium different from the first portion of the medium, to radiation from the single radiation emitter to heat the medium to a second temperature to record the image;
   - wherein, the first temperature is below a threshold temperature at which the medium records images and the second temperature equals or exceeds the threshold temperature.

2. A method according to claim 1, wherein the medium is continuously subjected to radiation from the single radiation emitter.

3. A method according to claim 1, wherein the first portion of the medium is subjected to radiation to heat the medium to the first temperature and the second portion of the medium is subjected to radiation to heat the medium to the second temperature and thereby record the image.

4. A method according to claim 3, wherein the first portion of the medium is disposed proximate to the second portion of the medium.

5. A method according to claim 3, wherein the first portion of the medium and the second portion of the medium are adjacent.

6. A method according to claim 3, wherein the second portion of the medium is recorded and the first portion of the medium is unrecorded.

7. A method according to claim 1, wherein radiation to heat the medium to the first temperature is at a first power and radiation to heat the medium to the second temperature and thereby record the image on the medium is at a second power, different than the first power.

8. A method for operating an imaging system for recording an image on a thermally sensitive medium, the system including a single radiation source for generating and emitting radiation and a modulator for modulating the emitted beam, comprising the steps of:
   - controlling the modulator to output radiation having a first power onto the medium to heat the medium to a first temperature below a threshold temperature at which the medium records images; and
   - controlling the modulator to output radiation having a second power to heat the medium to a second temperature, which is at least equal to the threshold temperature, to record the image on the medium.

9. A method according to claim 8, wherein:
   - the single radiation source is operated to continuously emit radiation onto the medium; and
   - the modulator is controlled to switch between a first mode of operation at which radiation having the first power impinges on the medium and a second mode of operation at which radiation having the second power impinges on the medium such that the continuously emitted radiation modulates between the first power and the second power.

10. A method according to claim 8, wherein radiation having the first power impinges on a first portion of the medium and radiation having the second power impinges on a second portion of the medium to record the image.

11. A method according to claim 10, wherein the first portion and the second portion of the medium are non-overlapping.

12. An imaging system for recording an image on a thermally sensitive medium, comprising:
   - a single radiation source configured to generate and emit radiation;
   - a modulator operable in a first mode to modulate the emitted radiation to form an outputted radiation beam having a first power and in a second mode to modulate the emitted radiation to form an outputted radiation beam having a second power; and
   - a controller configured to control the modulator so as to operate in the first mode to heat the medium to a first temperature below a threshold temperature at which the medium records images and to operate in the second mode to heat the medium to a second temperature, which is at least equal to the threshold temperature, to record the image on the medium.

13. A system according to claim 12, wherein the first power is different then the second power.

14. A system according to claim 12, wherein:
   - the single radiation source is further configured to continuously emit radiation onto the medium; and
   - the controller is further configured to control the modulator to switch between the first mode of operation and the second mode of operation such that the continuously emitted radiation switches between the first power and the second power.

15. A system according to claim 12, wherein:
   - in the first mode of operation, the outputted radiation beam of the first power impinges on a first portion of the medium; and
   - in the second mode of operation, the outputted radiation beam of the second power impinges on a second portion of the medium to record the image.

16. A system according to claim 15, wherein the first portion and the second portion of the medium are non-overlapping.

17. A system according to claim 12, further comprising:
   - an optical scanning device configured to scan the outputted radiation beam on the medium; and
   - wherein the controller controls the modulator such that, with the modulator operating in the first mode, the outputted radiation beam is scanned by the optical scanning device on a first portion of the medium which is to be unrecorded and, with the modulator operating in the second mode, the outputted radiation beam is scanned by the optical scanning device on a second portion of the medium to be recorded.

18. An imaging system for recording an image on a thermally sensitive medium, comprising:
   - a single radiation source configured to continuously emit a beam of radiation;
   - a modulator operable in a first mode to modulate the emitted radiation beam to form a first radiation beam having a first power and in a second mode to modulate the emitted radiation beam to form a second radiation beam having a second power different than the first power; and
   - a controller configured to control the modulator so as to operate in the first mode to output the first radiation beam onto a first portion of the medium which is to remain unrecorded and in the second mode to output the second radiation beam onto a second portion of the medium, different than the first portion of the medium, to record the image on the medium.

19. A system according to claim 18, wherein the first power is different than the second power.

20. A method for recording an image on a thermally sensitive medium using a single radiation source, comprising the steps of:

continuously emitting radiation;

forming the emitted radiation into a first radiation beam having a first power;

directing the first radiation beam onto a first portion of the medium which is to remain unrecorded;

forming the emitted radiation into a second radiation beam having a second power different than the first power; and directing the second radiation beam onto a second portion of the medium, different than the first portion of the medium, to record the image on the medium.

21. A method according to claim 20, wherein the first power is different than the second power.

* * * * *